United States Patent [19]

Spencer

[11] 4,057,932
[45] Nov. 15, 1977

[54] CONTAINER FOR SEEDLINGS

[76] Inventor: Henry Anderson Spencer, 8005-137th St., Edmonton, Alberta, Canada, T5R0C1

[21] Appl. No.: 728,640

[22] Filed: Oct. 1, 1976

Related U.S. Application Data

[63] Continuation-in-part of Ser. No. 538,540, Jan. 6, 1975, abandoned, which is a continuation-in-part of Ser. No. 445,443, Feb. 25, 1974, abandoned, which is a continuation of Ser. No. 250,994, May 9, 1972, abandoned, which is a continuation-in-part of Ser. No. 126,605, March 22, 1971, abandoned.

[51] Int. Cl.² .............................................. A01G 9/02
[52] U.S. Cl. ......................................... 47/77; 47/84; 47/85; 206/423; 220/306; 229/2.5 R
[58] Field of Search .................................. 47/73–78, 47/84–87; 229/2.5, 15, 1.5; 220/306, 337, 307; 206/423

[56] References Cited

U.S. PATENT DOCUMENTS

| | | | |
|---|---|---|---|
| 1,121,232 | 12/1914 | Davis | 229/15 |
| 2,022,548 | 11/1935 | Otwell | 47/77 |
| 2,318,711 | 5/1943 | Phelan | 47/73 |
| 2,990,945 | 7/1961 | Smith | 229/2.5 R |
| 2,999,611 | 9/1961 | Paulson | 220/306 X |
| 3,195,272 | 7/1965 | Mosher et al. | 47/73 |
| 3,257,023 | 6/1966 | Braverman | 220/306 X |
| 3,284,949 | 11/1966 | Park | 47/84 |
| 3,447,261 | 6/1969 | Hundt | 47/77 |
| 3,463,345 | 8/1969 | Brockenstette | 220/337 |
| 3,557,489 | 1/1971 | Ferrand | 47/77 |
| 3,647,105 | 3/1972 | Keeslar | 229/15 |
| 3,868,054 | 2/1975 | Congleton | 229/2.5 |
| 3,889,416 | 6/1975 | Bergeron et al. | 47/84 |

FOREIGN PATENT DOCUMENTS

| | | | |
|---|---|---|---|
| 259,284 | 4/1964 | Australia | 47/85 |

OTHER PUBLICATIONS

Kinghorn, J. M. "The Status of Container Planting in Canada," 1970, The Forestry Chronicle, Dec. pp. 466–469.
Cayford, J. H. Oct. 1972, "Container Planting Systems in Canada," The Forestry Chronicle, pp. 235–239.
Spencer, H. A. 10–1972, "Planting from the Book," The Forestry Chronicle, pp. 240–245.
Spencer, H. A. 1974, "To Engineer the Container" Paper Presented at: Proceedings of the North American Containerized Forest Tree Seedling Symposium, pp. 229–232.

Primary Examiner—Edgar S. Burr
Assistant Examiner—James R. Feyrer

[57] ABSTRACT

The invention as described in the present specification provides an improved container for growing seedlings for transplanting. The container is split in half longitudinally. The two half sections may be separate, in which case they are held together by the walls of a crate into which a number of the containers are placed. Alternatively, the sections may be connected together along their bottom margins by a hinge. In this latter case the container can be opened in the manner of a book to expose the seedling and root ball for easy extraction. Each half section comprises a pair of spaced, inwardly-protruding shoulders and a web connecting the shoulders. When the two half sections are pressed together, the shoulders mate — the opposed webs and shoulders then define an open-topped cell having an air-pruning opening at the base thereof. The webs are formed to provide vertical grooves running the length of the cell to the air-pruning opening. These grooves direct the growing seedling roots to the opening and thereby encourage the development of a thick growth of downwardly extending, straight roots.

27 Claims, 15 Drawing Figures

CONTAINER FOR SEEDLINGS

CROSS-REFERENCE TO RELATED APPLICATIONS

This application is a continuation-in-part of application Ser. No. 538,540, filed Jan. 6, 1975, now abandoned, which was a continuation-in-part of application Ser. No. 445,443, filed Feb. 25, 1974, now abandoned, which in turn was a streamlined continuation of application Ser. No. 250,994, filed May 9, 1972, now abandoned, which in turn was a continuation-in-part of application Ser. No. 126,605, filed Mar. 22, 1971, now abandoned.

BACKGROUND OF THE INVENTION

This invention relates to containers for raising plants for transplantation, and particularly to improvements in containers which provide a container planting system superior to other known systems, and which provides an adaptability not found in other plant container systems.

Horticulture and forestry practices recently have undergone changes in techniques. Industrial ideas have been applied to these practices to make the two disciplines more efficient than in the past. Standardization of product, mass handling systems, and a "product engineering" approach to growing plants has resulted. Among the systems now practised is one known as "Container Planting", where a plant is kept in a standard container, not unlike a flower pot, and is protected during the critical stages in its early growth. The container is used throughout all the rearing stages, before final transplanting occurs, and this would include seeding and/or placing a cutting into a container.

Man has long recognized the need to replace forests, and reforestation has been extensively practised in many areas. Reforestation has been carried out by a number of different methods, including:

1. the natural method, whereby a forested area is allowed to regenerate itself; and
2. the nursery method.

The natural method of reforestation, as will be appreciated, is haphazard.

Nurseries were the first step in meeting some of the demand for new trees. In the nursery method of reforestation seed is collected, prepared, sowed in long narrow beds in as dense concentration as possible, and covered with mulch; the beds are watered and the seedlings tended as they germinate, sprout and begin to grow. Two years later, when the seedlings are three to five inches high, they are dug up, the uppromising ones are culled, and the seedlings are transplanted by machine into other beds, and spaced out to allow further growth. After a further two years, the seedlings are considered strong enough to stand transplanting at their final site, and are then uprooted again and moved out to the forest. This method still is used; however, it has been at least partially supplanted by a newer method, container planting.

Largely as a result of the needs of reforestation programs, a good deal of work has been carried out in recent years to develop improved methods and equipment for growing and planting seedlings. One promising method, with which this invention is concerned, is known as container planting, and this method has become a useful addition to the nurseryman's techniques. The time-honored method of raising seedlings in a nursery bed has some disadvantages, notably the lack of control over disease, the damage to seedlings from pests and weather, and the tendency of certain tree varieties to send out long roots which would need to be pruned before the tree could be removed, transported, and transplanted. Such pruning has often set back a seedling's growth or caused deformation and weakening of the root system.

The "container" method involves providing a large number of cell-defining containers. The containers are filled with a growing medium, such as peat moss, and a seed is planted in each cell. After covering with grit or mulch, the seeds are permitted to germinate, and after they begin to grow, the young seedlings may be kept in a greenhouse from 4 weeks to 8 months depending on the variety and on the available environmental control. At this point, the seedlings may be set out into a shaded area to acclimatize them to normal conditions before being transplanted. In some cases, a dormant condition is desired for transplanting, so the young seedlings may be specially treated with fertilizers, or in addition may be slowly cooled. In the planting season, the seedlings are transported to the planting site directly in their containers, and kept in them for as long a time as possible. The planting operation is commonly carried out by a three-man crew. One of the crew carries the containers and distributes them to the other two; these men, the planters, each form cavities in the soil with a dibble stick, extract the seedlings and attached root balls from the cells and tamp them into the cavities.

A good container is one of the keys to the success of this system. In the greenhouse stage, the container should provide cells which foster the development of a thick system of roots. Without a good root structure, the plant will usually not survive in the field. For the purposes of the planting stage, the container should be a compact article which can be easily handled by the planters and which is adapted to permit efficient extraction of the seedling and root ball in an undamaged condition from the cell.

Advantages of container planting are as follows: 1. Each seedling is given an individual, non-competitive, controlled environment in which to grow and develop. 2. Seedling production — seeding, thinning, weeding, atmosphere, fertilization, light control, temperature regulation and above all, handling, can be mechanized. 3. Seedlings are not "shocked" by transplanting, since they are in individual "pots" and the roots do not get damaged during this mechanical operation. 4. Because the seedlings will not be "shocked" they may be transplanted during summer months on a regular, weekly or daily basis. High productivity of labor and facilities, high survival rates and tangible good results are realized.

The prior art containers used in reforestation projects can be classified into two broad groups. The first group comprises plastic trays or blocks having rows of separate, tapered cells formed in them. To extract the seedling and root bulb from this type of cell, one grasps the seedling, at a time when the peat moss has become root bound, and simply pulls it out. A problem with this type of tray is that the time when the ball is root bound dictates when planting can be carried out. Another disadvantage is that the trays are quite bulky and relatively large quantities of plastic are used in making them. The second group of containers comprises a single cell unit, such as a paper or plastic cylinder. Most containers of this type are buried in the soil together with the root ball, and seedling. Because the only egress available to the roots is straight down through the open end of the container, there is initially little lateral growth of the roots. As a result, the plant is not well anchored during its early development; this leads to poor growth and a high mortality rate due to causes such as frost heaving. Another defect of this type of container is that the amount of labor required to handle large numbers of individual, separate cells is higher than is the case with multiple-cell units.

A distinct drawback to the use of the above type of planting container, which is intended to be allowed to degrade and is therefore left in the ground, is that the soil bacteria, the temperature, and generally the climate, must be just right or else the degradation of the container will take place too slowly, causing problems with root entrapment and deformation of the transplanted seedling.

Container planting involves the use of environmental control during germination and early growth, providing healthy plants with a good chance of survival after transplanting, and specifically allows tree seedlings to grow in individual cells. A problem with many varieties of plant containers has been their need to have long and deep cells for handing tap root development or to enable the transplanted seedling to reach a low water table. Ordinary pots or deep cells of this kind do not allow easy removal of the seedlings for transplanting until the whole volume has been filled with roots. Sinch such root-binding is undesirable horticulturally, it is useful to have an easy method of withdrawal, which allows the whole plug of roots and soil medium to be handled without damage and to be placed without any restrictive covering into the transplanting site.

The present invention provides the above advantage, and also allows for easy inspection of root development without disturbing the root system or straining the stem or trunk of the seedling. It is either a folding planter or one made in two halves, single or multiple, which can be removed from a box and opened easily, without restriction, along an axial split to reveal the root system for examination or easy removal for planting or culling. The same container(s) and plant(s) may then be closed and replaced in the box, which in turn hold the two sides together in each container. Although there is no frictional joint to slow down the process of opening or closing the container(s), there is a shiplap joint which provides a long and difficult path for probing roots to traverse and escape into adjoining containers.

Within the walls of the container(s) of this invention and formed into the sides are longitudinal grooves, which catch and hold roots as they develop, and prevent roots from spiralling, which is the roots' natural tendency when they reach a smooth-walled surface. At the bottom of the contrainer(s) the growing medium must be supported, yet as large as possible an opening is maintained to provide space for developing roots. In practice, roots are allowed to emerge from the bottom of the container(s) but are prevented from growing further by circulation of air under the container(s). The grooves are able to direct outside roots straight toward this opening, and since the roots in them are also straight, these roots become end-withered quickly. As the plant has certain root-promoting qualities which are frustrated by this, it throws out branches of roots which repeat the process.

It is therefore an objective of this invention to provide a container whose structure is adapted to direct root growth to an air-pruning aperture to promote the growth of a thick root system having relatively straight roots.

It is another objective to provide a container from which the seedling and root ball can be easily extracted at any time for planting.

An addition preferred objective of this invention is to provide a container having a large air-pruning aperture.

It is a further preferred objective of this invention to provide a container having a number of cells for raising seedlings.

Still another objective of the invention is to provide a compact container which is easily handled and which is made from a relatively small quantity of plastic.

In accordance with one aspect of this invention, a container is provided having a large root-pruning aperture at its base together with a number of circumferentially spaced, downwardly-extending root grooves formed by the interior surface of the container's side wall. The roots of the seedling grow laterally out to the container side wall and then follow the root grooves down to the aperture — on contacting air, which is of course devoid of nutrients, the roots wither, with the result that new roots sprout, thereby developing a thick root system.

In accordance with a preferred form of the invention, a multiple-cell, single row container is provided. It is split longitudinally and preferably hinged along its bottom edges so that it can be opened to expose the contents of its two halves. To extract the seedling from one of the cells, the planter opens the container and holds it in the palm of one of his hands, as one would do with a book, or places it in a carrying pouch, and uses his other hand to gently pry the exposed root ball free. At the same time, he may flex the thin-walled, flexible sheet plastic container to aid in releasing the root ball. In the greenhouse, the containers are tightly packed together in rows in a tray or box; the walls of the tray or box act to hold the containers closed. The structure of the container is such that it can be formed from a single, thin sheet of plastic; the consumption of raw material in manufacturing it is therefore kept to a minimum.

For mass production, it is more economical to have the containers in ganged and hinged "books" which are held closed within the confines of a foraminous-bottomed box. Several variations of this version with and without the hinges are possible. For individual plant sales or for such applications as when the grower may wish to keep individual plants separate, a tube-like container may be provided with most of the above-mentioned specific features which are improvements to container planting, and in addition some other features especially suited to the individual container.

A common feature of these containers is the form of the side walls of the container, which contain multiple grooves or flutes (more than four) which extend throughout the full effective length of the container to direct roots to the opening at the bottom. When filled with a growing medium, plants grow roots in each container, which roots are directly channeled toward the bottom by being trapped in these grooves or between ridges of the flutes. By the term "effective length", is meant that part of the container which contains the growing medium.

Another common feature of these containers is their combination with a box, tray or comparable flat-bottomed holder which holds them in a satisfactory position for filling, either by having the box or tray made with a foraminous bottom which will not allow the growing medium to fall through (but will allow the roots to penetrate) or by preventing the folding "books" from coming open, or both.

Another common feature of these containers is their substantially constant cross section throughout their effective length, which gives the roots as much unrestricted volume as possible, and assists in maintaining a tight pack of containers for vibration filling, the box or tray being the holding fixture with vertical parallel sides, and the containers being fitted tightly into the box.

A specific feature of the folding ganged container is its hinged design, which allows the ganged container (when removed from the holding box or tray) to be opened and closed like a book so that the progress of fertilization may be studied. In early development of the plants, during climatic changes which provide more or less humidity and more or less heat, development of the plant may not match the fertilizer regimen that has been chosen. In a case for example, where fertilizer has built up and salts have collected in the containers, the roots may rot out, unless the excess fertilizer is leached through by plain water. Such conditions are not easy to discern unless the state of the roots can be inspected. In other containers, it is difficult to remove the "plug" of growing medium without damaging the root structure. Hence it is important to be able to open the container on a hinge and to close it up again without disturbing the plant, and this invention provides an easily opened container without snaps, catches or friction locks.

The present invention in one broad aspect resides in a container for growing seedlings, said container being normally upstanding when in use and comprising a pair of first and second wall members, each formed of thin-walled, flexible, substantially non-porous sheet plastic. Each said wall member comprises a series of spaced, inwardly-projecting, elongate shoulders integrally joined by webs, the shoulders of the first wall member being mutually opposed relative to the shoulders of the second wall member, and said mutually opposed shoulders are provided with inter-engaging means, whereby when the wall members are pressed together, a series of open-topped cells are formed, defined by the shoulders and their connecting webs and closed along the greatest part of their length. The aforesaid shoulders and webs combine to form a series of parallel, inwardly-directed, relatively broad, deep grooves within said shoulders. Said grooves extend perpendicularly downwardly from the wall members' upper edge portions, and the lower end portions of each pair of opposed webs and integrally joined shoulders combine to form the base of each cell, within which is formed an aperture, which aperture is smaller than the aperture at the top of the cell; said webs constituting the predominant portion of the side walls of the container, and each pair of opposed webs forming the side walls of an individual cell of said series of cells. Each said web is corrugated longitudinally of said cell, the grooves of the corrugations on the interior side walls of each said cell extending downwardly directly toward the base aperture and constituting a series of root grooves for directing root growth toward said aperture. Also included are hinge means connecting the wall members at their lower ends.

In another broad aspect, this invention resides in the combination of a plurality of seedling-growing containers as defined above, and a holder for the containers. The holder is one which has side and end walls and a flat, foraminous bottom, and is suitably a box or tray. The containers are disposed in abutting relationship both with respect to each other and to the walls of the holder, and fill the holder.

For a more detailed description of the invention, reference will now be made to the accompanying drawings which illustrate various aspects of the present invention by way of example, and wherein.

Referring now to FIGS. 1-6, the container illustrated 1 includes a pair of upstanding, opposed, generally rectangular wall members 2, 3 hinged along their bottom edges by the horizontal, rectangular hinge member 4. The wall and hinge members 2, 3, 4 are formed from a single, thin-walled, flexible, non-porous plastic sheet so as to provide a unit comprised of three integral parts.

Each wall member 2, 3 comprises a series of spaced, inwardly projecting, elongate shoulders 5, 6 joined by curved webs 7, 8. The shoulders 5, 6 and webs 7, 8 combine to define two rows of parallel, open-topped, inwardly-opening, downwardly-extending grooves 9, 10 of semi-circular cross section. The shoulders 5 of the wall member 3 are mutually opposed relative to the shoulders 6 of the wall member 2 whereby, when the container 1 is closed, they combine to define a row of separate compartments or cells 11.

In a preferred feature, the shoulders 6 have pointed edges 12 and the shoulders 5 have indentations 13. When the wall members 2, 3 are pressed together, the edges 12 seat in the indentations 13 to provide tight, lengthwise seals between adjoining cells.

The shoulders 5, 6 and webs 7, 8 are tapered and curved, respectively, to provide gathered portions 14, 15 at the bases of the grooves 9, 10. Semi-circular apertures 16, 17 are formed in the gathered portions 14, 15. When the container 1 is closed, the apertures 16, 17 unite to form apertures 30 for drainage and air pruning.

One of more inwardly-opening, longitudinal root grooves 18, 19 are formed in the webs 7, 8. These grooves 18, 19 lead down to the base apertures 16, 17 and serve to direct root growth in that direction.

Adjacent the upper ends of some of the shoulders 5, 6 tapered sockets 20 are formed; lugs 21 extend from the opposed shoulders so as to frictionally engage the sockets 20 when the container 1 is closed. These elements combine to hold the container 1 closed under most circumstances and prevent the wall members 2, 3 moving vertically relative to one another.

Turning to hinge member 4, a series of openings 22, which correspond with the apertures 30, are provided. In addition, the hinge member 4 is formed to provide a series of downwardly-extending lugs 23. These lugs 23 serve to elevate the container 1 above the tray floor (not shown) so that the roots protrude through the apertures 30 and 22 for pruning.

In use, a number of the containers 1 are stacked together in a closed, upstanding position in a tray or box. Peat moss or other suitable growing medium is packed into the cells 11, and a seed is planted in each. With watering, the seed germinates and grows into a seedling. As its roots lengthen, they are guided downward by the grooves 18, 19 to the apertures 30. When the roots protrude out of the growing medium and contact air, they wither at their ends. The seedling then sprouts more roots and the sequence is repeated. In this way, a thick growth of relatively straight roots is gradually developed. The roots of each seedling are prevented by the combination of the shoulder edges 12 and indentations 13 from extending into the next cell. As a result, the roots of adjoining seedlings do not become entangled with each other. When the seeldings are to be planted, the closed containers are packed in boxes and carried into the fields. There each container is opened to expose the seedling and its root ball. These are extracted in the manner previously described and the empty container is retained for re-use.

According to one method of manufacture, the container is thermo-formed from 0.010 inch thick, base stock, high impact polystyrene. This plastic strip is indexed into a hydraulic press having a perforated, heated platen which is equipped with a sealing ring circumscribing its working face. The press forces the plactic against a corresponding ring on the mold side, thereby sealing the working area of the plastic. The mold is suitably perforated to allow for the passage of air. The plastic is prestretched and forced by air fed through the mold against the heated platen, which has a vacuum applied against its non-working side. A vacuum is then applied to the nonworking side of the mold, and air is passed through the platen to force the plastic onto the mold where it cools to a rigid state. The press then opens and the plastic is lifted off the mold and conveyed into a punch press. The necessary holes are punched and parts cut out, except for connecting tabs, by the press. The material is then moved to a cut-off knike and the units are separated.

An alternative embodiment of the container is shown in FIGS. 7 - 10. In this version, the opposing shoulders are constructed to provide shiplap joints which maintain separation between the cells even when the container walls are forced slightly apart, as can occur when the growing medium settles within the cells with a wedging action. As mentioned above, cell separation is desirable to prevent intermingling of the plant root systems.

In greater detail, the container 50 comprises opposed first and second wall members 51, 52, each having shoulders 53, 54. The shoulders 53 are rebated along their right-hand side edges to define the grooves 55; the shoulders 54 are rebated along their left-hand side edges to define the grooves 56. The grooves 55, 56 terminate short of the upper ends of the shoulders 53, 54. Short grooves 57, 58 are formed in the left- and right-hand edges respectively of the shoulders 53, 54. It is to be noted that the shoulders 53, 54 of wall 51 are mutually opposed to the shoulders 54, 53 of wall 52. As a result, the non-rebated portions 59, 60 of shoulders 53, 54 seat in the grooves 57, 58 of shoulders 54, 53 when the walls 51, 52 are in the closed position to provide shiplap joints. An interlocking arrangement is thus provided which reduces twisting and distortion of the shoulders when the container is in use.

Figure 1:
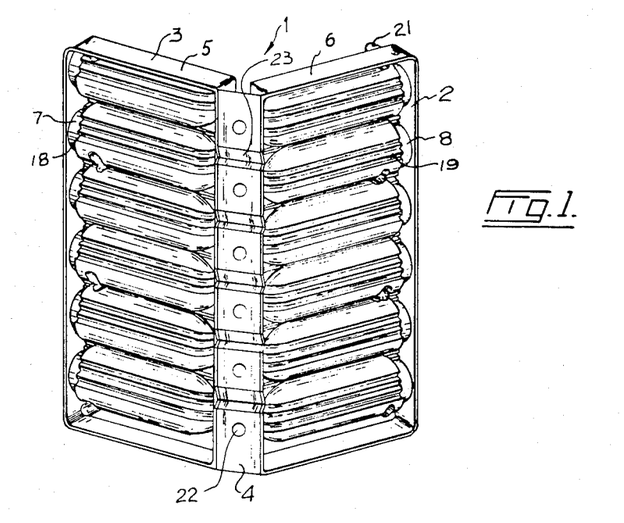
FIG. 1 is a perspective view of one form of the container in the open position.
Figure 2:
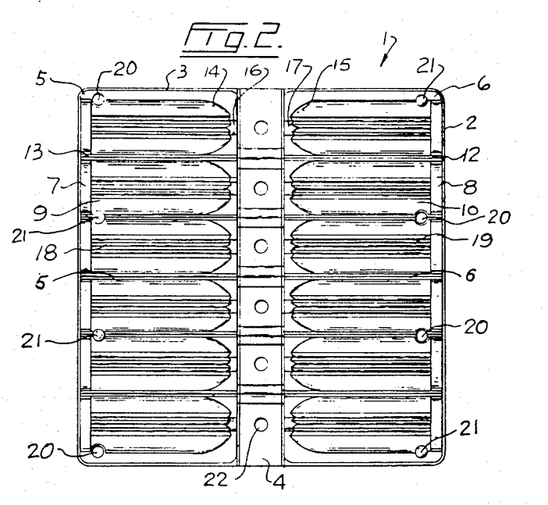
FIG. 2 is a plan view from above of the container illustrated in FIG. 1.
Figure 3:
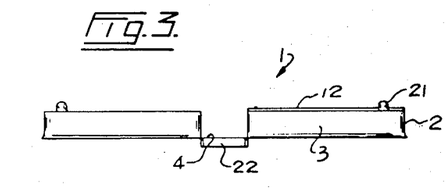
FIG. 3 is an end view of the container of FIG. 1 in the open position.
Figure 4:
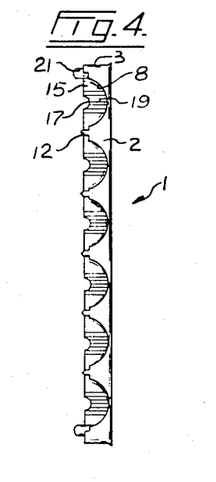
FIG. 4 is a side view of the container of FIG. 1.
Figure 5:
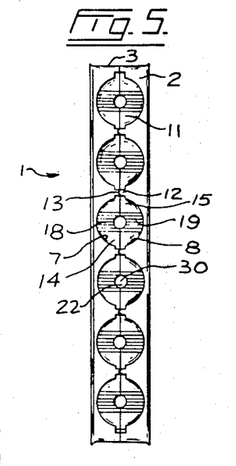
FIG. 5 is a top view of the container of FIG. 1.
Figure 6:
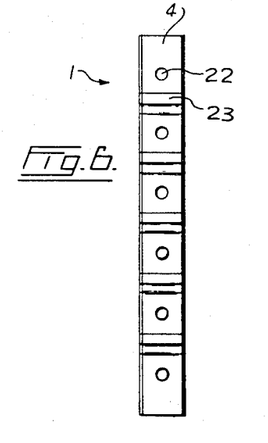
FIG. 6 is a plan view from below of the container of FIG. 1.
Figures 7, 8:
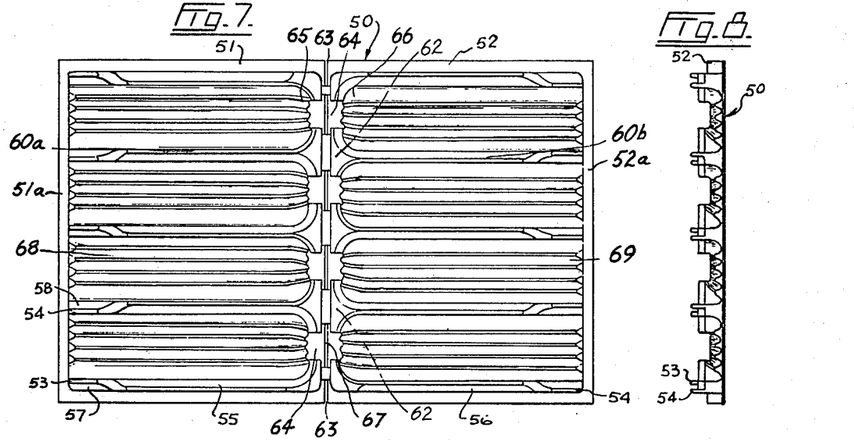
FIG. 7 is a top plan view of an alternative embodiment of the container in an open, flat position.
FIG. 8 is a top plan view of one side wall of the container shown in FIG. 7.
Figure 9:
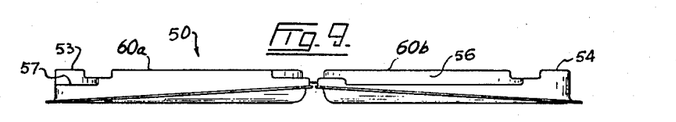
FIG. 9 is a side view of one end of the container shown in FIG. 7.
Figure 10:
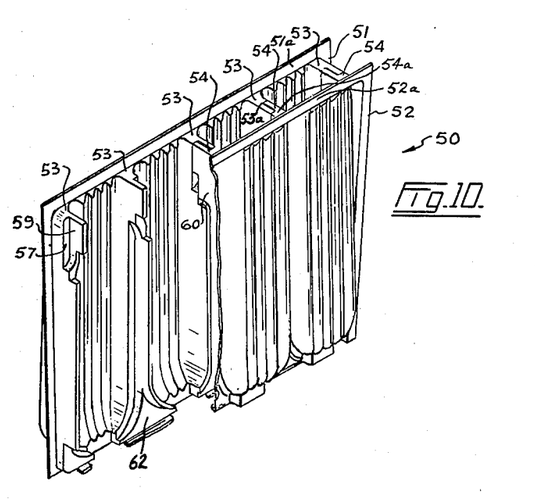
FIG. 10 is a partly cut-away perspective view of the container of FIG. 7 in the closed position.

At the base of this embodiment of the container as shown in FIG. 7, there are a series of hinged members 62, each being integrally formed with an adjacent pair of opposed shoulders and interconnecting webs of container 50, which hinged members are foldable along hinge line 63. Referring now to FIG. 7 which illustrates the container in an open flat condition, the hinged members are raised relative to the corrugated side walls of the cavities in the manner of a plateau, as it were, but are below the level of the pointed edges 60a, 60b of the shoulders 53, 54. Between each adjacent pair of hinged members 62 and also between the gathered portions 65, 66 of the opposed shoulders and interconnecting webs of container 50 a comparatively wide and shallow channel-shaped depression 64 is formed. The shape of the hinged sections 62 and channel-shaped depressions 64 is as shown in FIGS. 7 and 10. During the process of manufacture of the containers, channel-shaped depressions 64 are slit in line with the hinges so that when the hinge is folded shut, the slit expands to provide a large drainage opening (not specifically shown in FIGS. 7-10) for each cavity, at location 67. When the container is in the closed position as illustrated in FIG. 10, each half of the hinged members 62 resembles a deltoid wingshaped member.

Figures 11, 12:
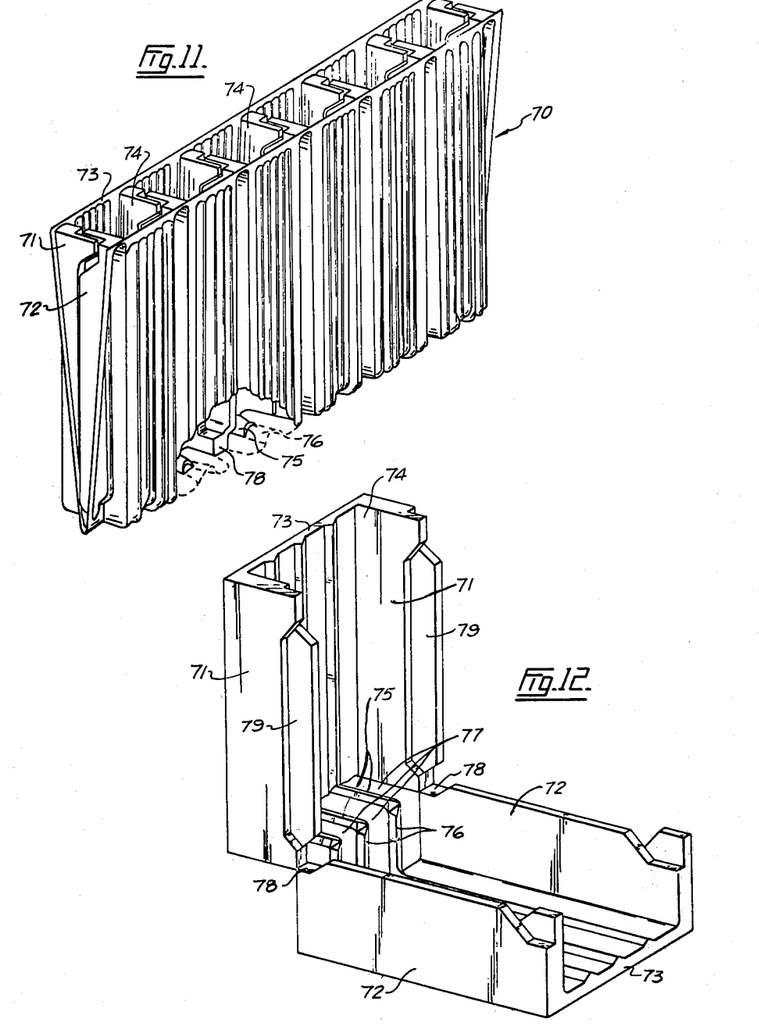
FIG. 11 is a perspective, partly broken-away view of an alternative embodiment of the container in the closed position.
FIG. 12 is a perspective view of a single cell member, similar to those shown in ganged arrangement in FIG. 11, in the open position.

In another embodiment illustrated in FIGS. 11 and 12, the container 70 is formed with shoulders 71, 72 and webs 73 which extend downwardly generally vertically, thereby providing a cell 74 of substantially constant cross-sectional area throughout its length. To prevent the contained peat moss or other growing medium from dropping out the base aperture, substantially horizontal, mutually opposed, finger-like members 75, 76 extend inwardly from the lower edge portions of each opposed pair of webs 73, to form a growing medium-retaining bar extending across the aperture to divide it into smaller apertures 77. As illustrated, the members 75, 76 are preferably connected at their ends to provide a hinge. The shoulders are also interconnected at their bases by horizontal members 78 — the members 75, 76, 78 combine to provide hinge means connecting the two wall members 79.

Figure 13:
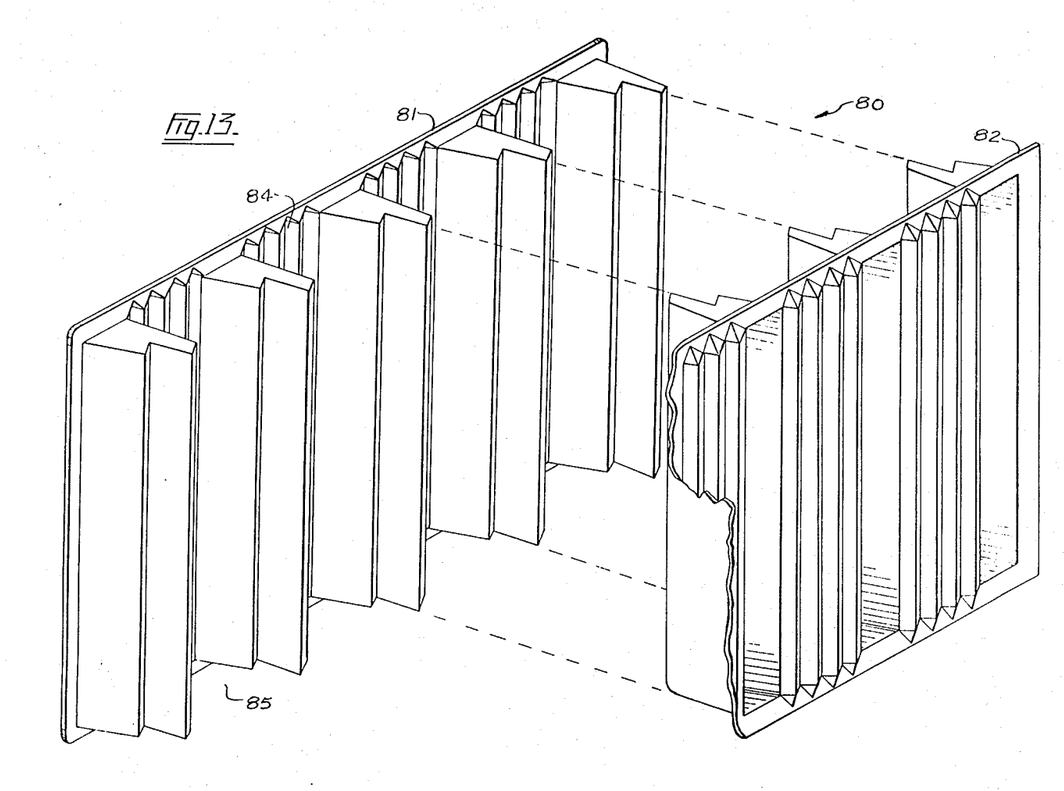
FIG. 13 is a perspective view, partly brokenaway, showing a container comprising separate wall members.
Figure 14:
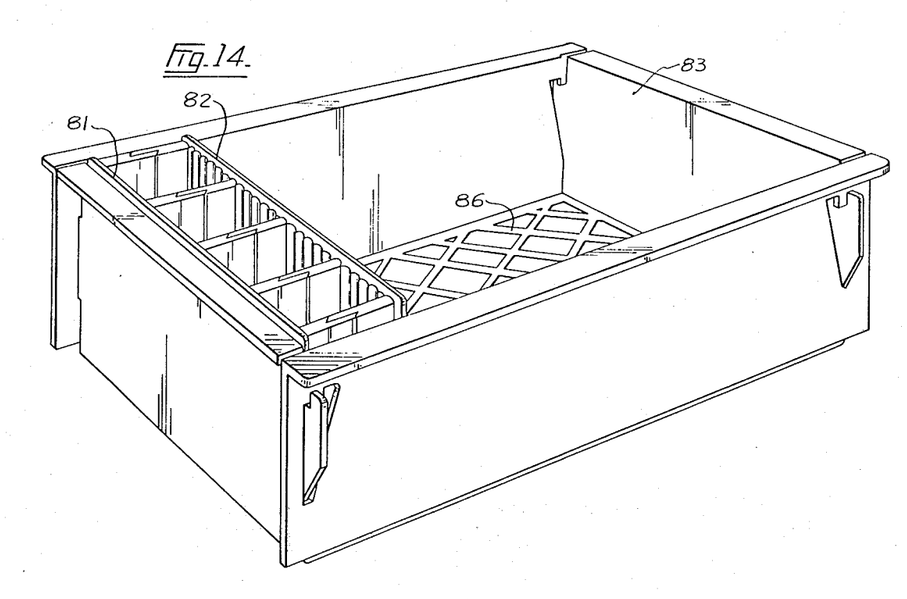
FIG. 14 is a perspective view of a container similar to that shown in FIG. 11, disposed in a box having a grid bottom.

In another embodiment illustrated in FIG. 13, the container 80 may comprise separate wall members 81, 82 which may be inserted in a box 83 having a grid floor 86 as shown in FIG. 14. When the box 83 is filled, the container wall members 81, 82 hold themselves up. As illustrated, a slightly different shiplap joint is used.

When this last-mentioned embodiment is in use, the roots grow down along the root grooves 84 to the apertures 85. Here they extend through the grid floor 86 and are air-pruned. The members of the grid floor traverse the base aperture of each cell, helping to hold the peat moss (or other growing medium) within the cell.

Another specific feature of the folding ganged container of this invention is the design of the grooves in the side walls. The side walls of each container cell or unit are provided with alternating longitudinal ridges and grooves on the exterior as well as the interior, as can be seen from an inspection of the drawings. Each ridge on the outer container wall is disposed directly opposite a groove in the interior side wall of the same container; that is to say, the side walls of the container are corrugated. Each such groove (referring here to grooves 18, 19 in FIG. 1, grooves 68, 69 in FIG. 7, and grooves 84 in FIG. 13) is so designed as to be in mating relationship with a corresponding ridge on the outer wall of a similar container placed in juxtaposition thereto, so that when another "book" or folded ganged container is placed next to it, the longitudinal ridges on the exterior walls of one such container mate with corresponding longitudinal grooves in the exterior walls of the container next to it, so that the containers are prevented from sliding laterally relative to each other.

Another specific feature of the folding ganged container of this invention is that the top portions of the wall members 51, 52 (FIGS. 7, 10) extend vertically a short distance above the working area of the effective length of the container as flanges 51a, 52a (FIGS. 7, 10). Referring here to FIGS. 7 and 10 of the drawings, at predetermined spaced intervals along the length of wall members 51, 52 there project shoulder members 53, 54 which are normal to the plane of the wall members 51, 52. The wall members of the containers when in use are vertical so that the shoulder members are horizontally extending. Each pair of wall members and shoulder members combine to define a container cell for holding growing medium within which an individual seedling may be placed. The top surface of shoulder members 53, 54 form ledges 53a, 54a (see FIG. 10) which, when the shoulders are joined together to provide a shiplap joint as previously described, form a ledge extending across the container. The vertically-extending flanges 51a, 52a and ledges 53a, 54a are smooth and straight rather than grooved or corrugated, as with the side walls of the container, so that when the ledges fit together, the possibility of the growing medium becoming lodged between adjacent container cells and between abutting ganged containers is substantially prevented; and so that excess growing medium may be placed above the container cells and later compressed down into the container cells. The ledges also act as a standardizing level for screening off excess growing medium during the filling stage. These ledges have a further purpose, that of shielding the plant in its succulent stage from being heavily battered by strong water and fertilizer sprays, and of catching and directing such sprays to the grooves, thereby enticing the roots toward the last wet place between waterings, at the outside wall of the container.

A further specific feature of the folding ganged container of this invention is the shape of the seal between cavities or cells, which seal is similar to a shiplap seal, and provides in each cavity half (as observed when opened up) a high portion on the one side and a low portion on the other side, which matches universally like two right hands or two left hands in a handshake, each to the opposite cavity half. Closed, the cavity has seal lines which are thus off the center line of the hinge by half the depth of the shiplap seal. The locking portions of this shiplap seal are like the thumbs of two right hands (or two left hands) and seal to the depth of the main shiplap seal. The cross-over from one side to the other is made with a minimum of an opening, so as to provide the least possible chance for roots to work their way between cavities. This minimum opening is provided by making the cross-over edges at 45° to the part line, so that the joint has only one small contact point. The joint is also kept as near to the top of the cavity as possible to again minimize root migration.

In use, a number of the containers of this invention, for example containers 50 as illustrated in FIGS. 7 – 10, or containers 70 as illustrated in FIG. 11, or 80 as illustrated in FIG. 13, are stacked together in abutting relationship in an upstanding position in a tray or box or comparable flat-bottomed holder. The containers are then filled with a growing medium, such as treated peat, ground bark, vermiculite, expanded perlite, sterilized soil or sand. After watering and settling, the containers are seeded. A vacuum-head seeder may be used, which simply draws seeds from storage to small holes arranged in the pattern of the cavities. The seeder is then placed over the tray and the vacuum released, which allows seeds to drop into each cavity. Next, a mulch, generally of sand or limestone grit, is sprinkled to cover the seed. Trays are put in a suitably warm place and covered with a polyethylene film while the seeds germinate. Overseeding often is done to ensure 100% utilization, so thinning becomes part of a later operation.

Germination takes place normally in a moist atmosphere at 70°-75° F. A sheet of thin polyethylene is wrapped around a batch of seeded, watered trays. Heat build-up during this period must be watched to provide the best temperature. When seeds reach above 80° F their rate of germination may decrease. It has been found that the early life of any plant is extremely sensitive to changes in environment, and it is desirable to keep plants in the greenhouse for at least 8 weeks after seeding, from the standpoint of the extra good start they get in life.

The containers of this invention are very useful during these first eight weeks.

During growth of the seedling, the technique of "Air-Pruning" is used to promote root growth. Normal growth of a root follows the path of least resistance, and guides such as the aforementioned grooves, tend to direct most of the roots which touch the side walls toward the bottom of the container. The biological urge which causes root growth is frustrated by the air which the emerging, growing root meets as it finds it way out of the bottom and withers off. This urge makes the roots within the container branch out further and more new roots then follow the grooves and ridges to the bottom where the process is repeated.

At any time during the seedling's growth, its root development may be inspected.

Figure 15:
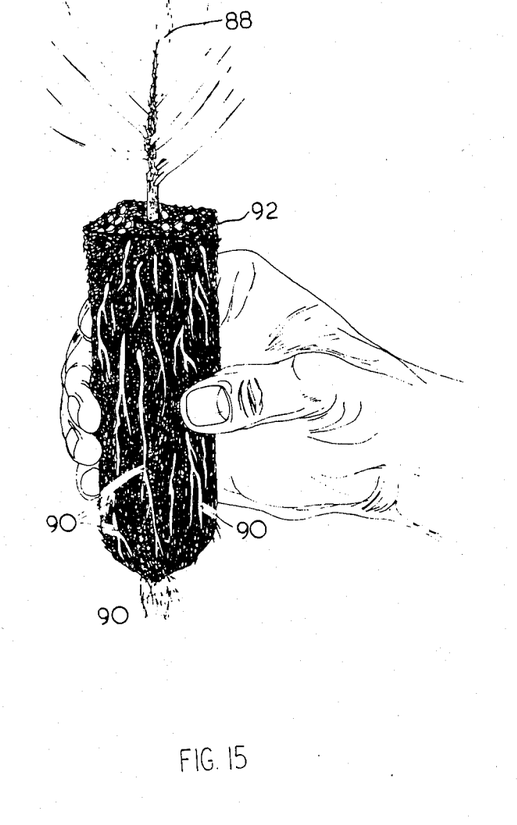
FIG. 15 is a pictorial representation, in perspective, of a typical growing seedling showing the root pattern developed by the use of the container of this invention.

All that is necessary is to take the filled container containing the growing seedling(s) (which, since it can be opened up like a book, will be referred to here as a "book"), open the "book", and visually inspect the root ball (plug). If desired for this purpose the root plug can be readily removed from the container and held in the hand, as illustrated in FIG. 15. The development of the seedling 88 (referring to that FIG.) and in particular its roots (90) can be seen at a glance. After inspection is completed, the root ball plug 92 comprising the seedling root system within the compacted growing medium, is simply placed back in the individual container cell from which it was taken, and the "book" is closed.

At the same time as the root development of the seedling is being inspected, the inspector can tell by the color of the growing medium whether there are dryness or over-watering problems. Root development in these early stages of development may be examined without damage to the plant.

When the seedling has developed to the point where it is large enough to transplant, the seedling in its container is moved to a semi-controlled outdoors area or to a small unheated greenhouse — the so-called "cold frame" — where the plant is acclimatized or "hardened" to outdoor conditions.

When moved out to the cold frames or open storage, the trays with enclosed containers are placed up off the ground. This enables "Air-Pruning" to occur. "Air-Pruning" is really a method of tricking the plant to put out branch roots. When the plant roots reach the open bottom of the container they dry off in the air. This temporary growth stoppage is biologically signalled to the seedling, and this triggers the development of new branch root growth. Since most roots are directed by the grooves in the container walls straight to the bottom, the process is speeded up by use of the containers of this invention. Normally, a nursery seedling, placed beside its fellows in a seed bed, develops very long roots that are few in number. The long roots cannot be transplanted so they are cut off, thereby "shocking" the transplant. In contrast thereto, seedlings grown in containers of this invention have all the roots intact when they are transplanted; so may be transplanted at any time, even when "flush" with new growth. All the roots of importance are on the outside, waiting to make contact with new soil, and they fan out evenly on all sides, making an ideal root system to prevent blowdowns at a later stage of growth.

The plant may then be taken directly to the transplanting area, and removed from the container by the same simple procedure as outlined previously herein in connection with the inspection of the seedling during its early growth.

Transplanting may be accomplished by ordinary standard methods, but the trays are compact and are often used to carry seedlings right to the site. A hoe, dibble, adze, mattock, spade or planting tube may be used. All methods have been tried with success in the field, and are chosen at the discretion of the planting supervisor.

The container of the present invention has a number of important advantages, summarized as follows:

1. The container can be made in any desired size to accommodate numerous different varieties of seedling.
2. Minimum storage and shipping costs.
3. The containers are easy to load, fill, seed, thin and weed.
4. The container grooves speed root development, minimize spiralling, promote healthy growth of contact roots, i.e., the roots which will first contact new soil when transplanted.
5. The containers of this invention allow inspection at any stage of growth. A "book" may be readily pulled out, opened, and one may "read" the root development of the seedling.
6. The container of this invention allows removal of the seedling at any stage of growth, and removal is very easy. All that need be done is to open the container. Smooth, hard sides, a hinged bottom and linear grooves make removal easy. No time is lost in transplanting directly from the box in the field.
7. The containers of this invention give nearly maximum bench density, yet may be spaced out to give leaf room at later development stages, without losing their multiple handling advantage.
8. The containers of this invention are useful for a wide variety of horticultural techniques: rooting from cuttings, sprouting from root cuttings, "air-pruning" of heavily tap-rooted plant varieties, and for many kinds of plants, from trees to wild grasses, to shrubs, to vegetables.
9. The containers of this invention grow plants that are easy to transplant. No special equipment is required, yet they will easily adapt to the most sophisticated transplanting machines.
10. The containers of this invention are relatively inexpensive to manufacture.

While preferred embodiments of this invention have been shown and described, modifications thereof can be made by one skilled in the art without departing from the spirit of the invention, which is defined in the appended claims.

I claim as my invention

1. A container for growing seedlings, said container being normally upstanding when in use and comprising: a pair of first and second wall members, each formed of thin-walled, flexible, substantially non-porous sheet plastic, each said wall member comprising a series of spaced, inwardly-projecting, elongate shoulders integrally joined by webs, the shoulders of the first wall member being mutually opposed relative to the shoulders of the second wall member, said mutually opposed shoulders being provided with inter-engaging means, whereby when the wall members are pressed together, a series of open-topped cells are formed, defined by the shoulders and their connecting webs and closed along the greatest part of their length; said shoulders and webs combining to form a series of parallel, inwardly-directed, relatively broad, deep grooves within said shoulders, said grooves extending perpendicularly downwardly from the wall members' upper edge portions; the lower end portions of each pair of opposed webs and integrally joined shoulders combining to form the base of each cell, within which is formed an aperture, said aperture being smaller than the aperture at the top of the cell; said webs constituting the predominant portion of the side walls of the container, and each pair of opposed webs forming the side walls of an individual cell of said series of cells; each said web being corrugated longitudinally of said cell, the grooves of the corrugations on the interior side walls of each said cell extending downwardly directly toward the base aperture and constituting a series of root grooves for directing root growth toward said aperture; and hinge means connecting the wall members at their lower ends.

2. A container as defined in claim 1, wherein the lower end portions of each pair of opposed webs are curved inwardly and the corresponding lower end portions of each pair of integrally joined shoulders are inwardly tapered.

3. A container as defined in claim 1 wherein the upper portions of each wall member of said container extend vertically a short distance above the upper edges of the shoulder members and form a pair of mutually opposed flanges, said upper edges of the shoulder members forming a ledge extending across the container when the shoulders are inter-engaged, said ledge and said flanges being smooth and straight.

4. A container as defined in claim 1, wherein said hinge means takes the form of a series of hinge members, each of which is integrally formed with an adjacent pair of opposed shoulders and interconnecting webs of said container, there being between each pair of adjacent hinge members a relatively wide, shallow channel-shaped depression provided with a slit along the line of folding of said hinge, such that, when the container is closed, in which condition the hinge member is folded, the slit expands to provide a large drainage and root-pruning aperture at the base of the cell.

5. A container as defined in claim 1, wherein the ridges on the exterior of the longitudinally corrugated side walls are so configured as to mate with corresponding grooves on the exterior of the corrugated side walls of a second counterpart seedling-growing container when the latter is in abutting relationship to the first-mentioned container, said configuration being thereby adapted to prevent relative lateral movement of said containers.

6. A container as defined in claim 1, wherein a pair of substantially horizontal, mutually opposed, finger-like members extend in from the lower end portions of each pair of opposed webs to form a growing medium-retaining bar extending across the base aperture.

7. A container as defined in claim 6 wherein the upper portions of each wall member of said container extend vertically a short distance above the upper edges of the shoulder members and form a pair of mutually opposed flanges, said upper edges of the shoulder members forming a ledge extending across the container when the shoulders are inter-engaged, said ledge and said flanges being smooth and straight.

8. A container according to claim 6, wherein said shoulders and webs extend downwardly generally vertically, whereby cells of substantially constant cross-sectional area are provided.

9. A container as defined in claim 8, wherein each of said root grooves is of a size and shape such as to direct root growth downwardly to said base aperture in a minimum of distance.

10. A container for growing seedlings according to claim 8, wherein said finger-like members forming said growing medium-retaining bar extending across the base aperture are joined at their ends, and the shoulders are interconnected at their bases by horizontal members, said joined finger-like members and said horizontal members constituting a hinge means connecting the wall members of the container at their lower ends.

11. A container according to claim 6, wherein the opposed shoulders are so constructed as to provide a shiplap joint along the greatest part of their lengths when pressed together, said shiplap joint maintaining separation between adjacent cells and restricting intermingling of root systems in said cells.

12. A container according to claim 11, wherein each first shoulder is rebated to define a first groove along one side edge thereof, and a second shoulder is rebated to define a second groove along the opposite side edge thereof, whereby the non-rebated portion of the first shoulder seats in the second groove and the non-rebated portion of the second shoulder seats in the first groove when the wall members are in the closed position to provide a shiplap joint.

13. A container according to claim 12, wherein the first and second grooves terminate short of the upper ends of the shoulders, the first shoulder is rebated along its remaining side edge to define a short groove at its upper end, and the second shoulder is rebated along its remaining side edge to define a short groove at its upper end, whereby the non-rebated upper portion of each shoulder seats in the short groove of the opposed shoulder when the container is closed to provide an inter-locking arrangement which reduces twisting and distortion of the shoulders when the container is in use.

14. A container according to claim 1, wherein the opposed shoulders are so constructed as to provide a shiplap joint along the greatest part of their lengths when pressed together, said shiplap joint maintaining separation between adjacent cells and restraining intermingling of root systems in said cells.

15. A container according to claim 14, wherein each first shoulder is rebated to define a first groove along one side edge thereof, and a second shoulder is rebated to define a second groove along the opposite side edge thereof, whereby the non-rebated portion of the first shoulder seats in the second groove and the non-rebated portion of the second shoulder seats in the first groove when the wall members are in the closed position to provide a shiplap joint.

16. A container according to claim 15, wherein the first and second grooves terminate short of the upper ends of the shoulders, the first shoulder is rebated along its remaining side edge to define a short groove at its upper end, and the second shoulder is rebated along its remaining side edge to define a short groove at its upper end, whereby the non-rebated upper portion of each shoulder seats in the short groove of the opposed shoulder when the container is closed to provide an inter-locking arrangement which reduces twisting and distortion of the shoulders when the container is in use.

17. A container as defined in claim 15, wherein said hinge means takes the form of a series of hinge members, each of which is integrally formed with an adjacent pair of opposed shoulders and interconnecting webs of said container, there being between each pair of adjacent hinge members a relatively wide, shallow channel-shaped depression provided with a slit along the line of folding of said hinge, such that, when the container is closed, in which condition the hinge member is folded, the slit expands to provide a large drainage and root-pruning aperture at the base of the cell.

18. In combination:
a. a plurality of upstanding containers for growing seedlings, each said container comprising a pair of first and second wall members, each formed of thin-walled, flexible, substantially non-porous sheet plastic, each said wall member comprising a series of spaced, inwardly-projecting, elongate shoulders integrally joined by webs, the shoulders of the first wall member being mutually opposed relative to the shoulders of the second wall member, said mutually opposed shoulders being provided with inter-engaging means, whereby when the wall members are pressed together, a series of open-topped cells are formed, defined by the shoulders and their connecting webs and closed along the greatest part of their length; said shoulders and webs combining to form a series of parallel, inwardly-directed, relatively broad, deep grooves within said shoulders, said grooves extending perpendicularly downwardly from the wall members' upper edge portions; the lower end portions of each pair of opposed webs and integrally joined shoulders combining to form the base of each cell, within which is formed an aperture, said aperture being smaller than the aperture at the top of the cell; said webs constituting the predominant portion of the side walls of the container, and each pair of opposed webs forming the side walls of an individual cell of said series of cells; each said web being corrugated longitudinally of said cell, the grooves of the corrugations on the interior side walls of each said cell extending downwardly directly toward the base aperture and constituting a series of root grooves for directing root growth toward said aperture; and hinge means connecting the wall members at their lower ends; and b. a holder for said containers, said holder having side and end walls and a flat, foraminous bottom for retaining growing medium in the cells, said containers being disposed in abutting relationship with respect to each other and to the walls of the holder, said containers filling said holder.

19. The combination according to claim 18, wherein said holder is a tray.

20. The combination according to claim 18 wherein the opposed shoulders are so constructed as to provide a shiplap joint along the greatest part of their lengths when pressed together, said shiplap joint maintaining separation between adjacent cells and restraining intermingling of root systems is said cells.

21. The combination as set forth in claim 18 wherein the upper portions of each wall member of each of said containers extend vertically a short distance above the upper edges of the shoulder members and form a pair of mutually opposed flanges, said upper edges of the shoulder members forming a ledge extending across the container when the shoulders are inter-engaged, said ledge and said flanges being smooth and straight.

22. The combination as set forth in claim 18 wherein, in each of said containers, said hinge means takes the form of a series of hinge members, each of which is integrally formed with an adjacent pair of opposed shoulders and interconnecting webs of said container, there being between each pair of adjacent hinge members a relatively wide, shallow channel-shaped depression provided with a slit along the line of folding of said hinge, such that, when the container is closed, in which condition the hinge member is folded, the slit expands to provide a large drainage and root-pruning aperture at the base of the cell.

23. A combination as set forth in claim 18 wherein the ridges on the exterior of the longitudinally corrugated side walls of each container are so configured as to mate with corresponding grooves on the exterior of the side walls of another of said containers abutting therewith, thereby to prevent lateral movement of the containers relative to others of said containers juxtaposed thereto.

24. The combination according to claim 18, wherein said holder is a box.

25. The combination according to claim 24, wherein the box has an open grid bottom, the members of the grid floor of said box traversing the base aperture of each cell of said containers.

26. The combination according to claim 18 wherein, in each cell of said containers, a pair of substantially horizontal, mutually opposed, finger-like members extend in from the lower end portions of each pair of opposed webs to form a growing medium-retaining bar extending across the aperture.

27. A combination according to claim 26, wherein the shoulders and webs of each of said containers extend downwardly generally vertically, whereby cells of substantially constant cross-sectional area are provided for each of said containers.

* * * * *